(12) United States Patent
Bajaj et al.

(10) Patent No.: US 9,838,843 B1
(45) Date of Patent: Dec. 5, 2017

(54) GENERATING DATA-DRIVEN GEO-FENCES

(71) Applicant: Adobe Systems Incorporated, San Jose, CA (US)

(72) Inventors: Payal Bajaj, Madhya Pradesh (IN); Sanket Vaibhav Mehta, Maharashtra (IN); Tanya Goyal, Maharashtra (IN); Shriram Venkatesh Shet Revankar, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/292,982

(22) Filed: Oct. 13, 2016

(51) Int. Cl.
   *H04W 24/00* (2009.01)
   *H04W 4/02* (2009.01)
   *H04L 29/08* (2006.01)

(52) U.S. Cl.
   CPC ............. *H04W 4/022* (2013.01); *H04L 67/18* (2013.01); *H04L 67/22* (2013.01)

(58) Field of Classification Search
   CPC ......... H04W 4/022; H04L 67/18; H04L 67/22
   USPC ............ 455/404.2, 412.1–414.2, 418–422.1, 455/552.1, 456.1–457
   See application file for complete search history.

(56) References Cited

U.S. PATENT DOCUMENTS

| | | | | |
|---|---|---|---|---|
| 7,848,765 B2* | 12/2010 | Phillips | .............. | G08B 21/0236 455/404.2 |
| 8,670,783 B2* | 3/2014 | Klein | .............. | H04W 4/022 340/539.13 |
| 8,890,685 B1* | 11/2014 | Sookman | .............. | H04W 4/22 340/539.13 |
| 9,253,728 B2* | 2/2016 | MacGougan | .............. | H04W 52/0254 |
| 9,473,890 B1* | 10/2016 | Liu | .............. | G01S 5/0284 |
| 9,622,033 B2* | 4/2017 | Goss | .............. | H04W 4/021 |
| 9,706,355 B1* | 7/2017 | Cali | .............. | H04W 4/022 |
| 9,712,962 B2* | 7/2017 | Birch | .............. | H04W 4/021 |
| 9,712,970 B2* | 7/2017 | Barrand | .............. | H04W 4/022 |
| 2012/0089465 A1* | 4/2012 | Froloff | .............. | G06Q 30/02 705/14.71 |
| 2014/0155094 A1* | 6/2014 | Zises | .............. | H04W 4/021 455/456.3 |

(Continued)

OTHER PUBLICATIONS

Douglas Karr; "Geo-Targeting, Geo-Fencing and Beaconing: Location Marketing;" https://www.marketingtechblog.com/geo-targeting-geo-fencing-and-beaconing-location-marketing-explained/; published Jun. 10, 2015.

(Continued)

*Primary Examiner* — Babar Sarwar
(74) *Attorney, Agent, or Firm* — Keller Jolley Preece

(57) ABSTRACT

The present disclosure is directed toward systems and method for generating geo-fences having boundaries around geographic regions of interest based on historical activity data of a user application on a plurality of client devices. For example, systems and methods described herein involve tracking activity data to identify instances of an application activity associated with an action to promote and identify locations where users more frequently perform the application activity. In addition, systems and methods described herein involve tracking activity data over time to determine geographic regions of interest at different time periods where users more frequently perform application activities. Further, systems and methods described herein involve generating geo-fences around one or more geographic regions of interest.

20 Claims, 11 Drawing Sheets

(56) References Cited

U.S. PATENT DOCUMENTS

| | | | | |
|---|---|---|---|---|
| 2014/0164118 | A1* | 6/2014 | Polachi | G06Q 30/0261 705/14.57 |
| 2014/0337123 | A1* | 11/2014 | Nuernberg | G06Q 30/0246 705/14.45 |
| 2015/0097683 | A1* | 4/2015 | Sloo | G01N 27/02 340/628 |
| 2015/0237193 | A1* | 8/2015 | Zeilingold | H04M 1/72572 455/418 |
| 2015/0237472 | A1* | 8/2015 | Alsina | H04W 4/021 455/456.3 |
| 2015/0278864 | A1* | 10/2015 | McDevitt | G06Q 30/0267 705/14.58 |
| 2015/0281889 | A1* | 10/2015 | Menendez | H04W 4/021 455/456.1 |
| 2015/0310729 | A1* | 10/2015 | Lampert | G08B 25/016 340/539.11 |
| 2015/0319568 | A1* | 11/2015 | Haro | H04W 4/021 455/456.1 |
| 2015/0350827 | A1* | 12/2015 | Birch | H04W 8/04 455/456.1 |
| 2016/0021500 | A1* | 1/2016 | Won | H04W 40/244 455/456.2 |
| 2016/0088436 | A1* | 3/2016 | Goss | G01C 21/3682 701/409 |
| 2016/0094944 | A1* | 3/2016 | Kong | H04W 4/022 455/456.1 |
| 2016/0146623 | A1* | 5/2016 | Ren | G06F 17/30336 701/400 |
| 2016/0261424 | A1* | 9/2016 | Gamberini | G05B 15/02 |

OTHER PUBLICATIONS

Sandro Rodriguez Garzon; Bersant Deva; "Geofencing 2.0: Taking Location-Based Notifications to the Next Level"; UbiComp '14 Proceedings of the 2014 ACM International Joint Conference on Pervasive and Ubiquitous Computing; Sep. 2014.

Anastasios Noulas; Salvatore Scellato; Cecilia Mascolo; Massimiliano Pontil; "An Empirical Study of Geographic User Activity Patterns in Foursquare"; Proceedings of the Fifth International Conference on Weblogs and Social Media; Jul. 2011.

Haipeng Zhang; Mohammed Korayem; Erkang You; David J. Crandall; "Beyond Co-Occurrence: Discovering and Visualizing Tag Relationships From Geo-Spatial and Temporal Similarities"; WSDM '12 Proceedings of the fifth ACM international conference on Web search and data mining; Feb. 2012.

Models.word2vec—Deep learning with word2vec; https://radimrehurek.com/gensim/models/word2vec.html; as accessed: Sep. 13, 2016.

Simon Wood; "Mixed GAM Computation Vehicle with GCV/AIC/REML Smoothness Estimation"; https://cran.r-project.org/web/packages/mgcv/index.html; Aug. 2016.

Trevor Hastie; Robert Tibshirani; "Generalized Additive Models;" Statistical Science as published by Institute of Mathematical Science; Aug. 1986.

Definition of Geo-Fencing, http://whatis.techtarget.com/definition/geofencing, as accessed: Sep. 13, 2016.

Valerie Morris; "The Basic Rules for Geofencing in Advertising;" http://www.data-dynamix.com/the-basic-rules-for-geofencing-in-advertising; Apr. 2015.

Author: Unknown; "The Top 4 Things You Should Know About Geofencing"; https://blog.instant.ly/blog/2013/05/the-top-4-things-you-should-know-about-geofencing/; May 27, 2013.

Chantal Tode; "More Precise Mobile Location Targeting Use by Advertisers is Skyrocketing: Report;" https://blog.instantly/blog/2013/05/the-top-4-things-you-should-know-about-geofencing/; Mar. 11, 2013.

Moasis Website; http://moasisglobal.com/; as accessed: Sep. 13, 2016.

Placecast Website; http://placecast.net/; as accessed: Sep. 13, 2016.

* cited by examiner

| Activity Rank | Restaurants | Rides | Sales |
|---|---|---|---|
| 1 | Performing A Dining Search (0.60) | Exploring Wait Times (0.29) | Reviewing A Purchase (0.36) |
| 2 | Scanning A Bar Code (0.56) | Purchasing A Guest Pass (0.26) | Buying A Product (0.35) |
| 3 | Purchasing A Guest Pass (0.21) | Buying A Ticket (0.25) | Buying A Ticket (0.29) |
| 4 | Checking Guest Services (0.21) | Expanding A Ticket Detail (0.25) | Expanding A Ticket Detail (0.20) |
| 5 | Booking A Reservation (0.20) | Claiming A Ticket (0.25) | Checking Guest Services (0.20) |

*Fig. 3*

GENERATING DATA-DRIVEN GEO-FENCES

BACKGROUND

Recent years have seen a rapid proliferation in location-based marketing. Indeed, it is now common for businesses, marketers, and various individuals to provide marketing messages to populations of users within a defined proximity and/or at specific locations. Utilizing location-based marketing at specific locations often results in more effectively serving relevant content to target populations of users having an interest in goods or services associated with the marketing content.

Conventional location-based marketing systems often cater to users within a proximity of a point of interest. For example, many conventional systems define a virtual boundary around a point of interest (e.g., a restaurant, retail store, hotel) and provide a marketing message to a user within the virtual boundary (e.g., within a fixed radius). The marketing message may include coupons, special offers, or other communications that encourage users to visit the point of interest or other nearby location and purchase goods or services. Simply identifying points of interest and communicating with nearby users, however, often fails to capture a relevant audience of users. For example, targeting users within a fixed proximity of a point of interest often over-targets a nearby population, targets a small population, or targets a population of users that have already decided on a particular purchase or activity prior to arriving within the proximity of the point of interest. As a result, conventional location-based marketing systems often fail to effectively capture a relevant audience.

Some conventional systems for location-based marketing overcome various inefficiencies by targeting densely populated areas of users. For example, many conventional systems define virtual boundaries around densely populated areas to ensure that a large number of people receive a given targeted message. While targeting densely populated areas generally captures more users and may provide a temporary boost for businesses, sending targeted messages to densely populated areas often over-targets populations and desensitizes users from heeding subsequent marketing messages. As a result, many users may uninstall an application or otherwise unsubscribe from receiving marketing messages, thus decreasing long-term effectiveness of location-based marketing. Additionally, targeting densely populated areas often results in greater costs for businesses or individuals that pay for a delivery of a certain number of targeted messages.

These and other problems exist with regard to sending location-based messages to populations of users.

SUMMARY

Embodiments of the present disclosure provide benefits and/or solve one or more of the foregoing and other problems in the art with systems and methods for generating data-driven geo-fences. In particular, the disclosed systems and methods generate a virtual boundary (e.g., geo-fence) around a geographic region based on gathered activity data. For example, given a desired marketing goal, the systems and methods extract application activity data for actions related to the marketing goal. The systems and methods determine proportions of users that performed the actions in proximity to various locations. The systems and methods use the determined proportions to learn where to place geo-fences that will promote the marketing goal. The systems and methods also dynamically modify the geo-fences over time based on the application activity data.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which:

FIG. 3 illustrates an example table including application activities associated with respective categories of user actions in accordance with one or more embodiments;

DETAILED DESCRIPTION

Figure 1A:
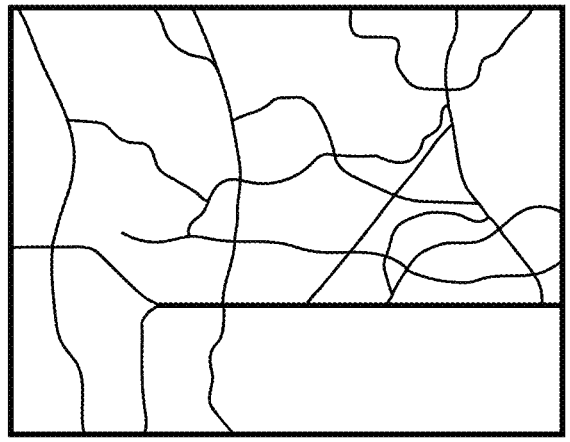
FIGS. 1A-1B illustrate example geo-fences on a map in accordance with one or more embodiments.

One or more embodiments of the present disclosure include a geo-fencing system that generates data-driven geo-fences. For example, the geo-fencing system identifies geographic regions of interest within which users are likely to be more receptive to marketing messages than users outside the geographic regions of interest. The geo-fencing system then generates a geo-fence around the identified geographic regions of interest. To accomplish this, the geo-fencing system tracks activity data including times and locations of application activities (e.g., mobile applications executing on user devices). Based on the tracked activity data, the geo-fencing system identifies geographic regions of interest in which users frequently perform various application activities. The geo-fencing system then generates geo-fences around the geographic regions of interest.

As used herein, a "geo-fence" refers to a virtual boundary around a geographic region. A virtual boundary of a geo-fence can be defined by coordinates of a global positioning system (GPS) or radio frequency identification (RFID) to identify a geographic region of interest. In one or more embodiments, a boundary of a geo-fence refers to a boundary made up of GPS coordinates (e.g., latitude and longitude coordinates). Alternatively, in one or more embodiments, the virtual boundary of a geo-fence is defined by a proximity to a fixed or moving point, such as a physical range of a wireless network (e.g., WiFi network), base station, or other system having a fixed or variable range.

As mentioned above, in one or more embodiments, the geo-fencing system tracks activity data to determine geographic regions of interest within which users are likely to be receptive to particular marketing content. In one or more embodiments, the geo-fencing system tracks activity data that relates to an application action or a category of application actions associated with a predefined goal (e.g., a marketing goal). For example, in one or more embodiments, the geo-fencing system identifies one or more application activities that correlate with, or frequently precede or co-occur with, a particular marketing goal (e.g., marketing athletic wear). The geo-fencing system then tracks or accesses activity data regarding those identified application activities (e.g., downloading sports mobile app, shopping for tennis shoes, purchasing sporting event tickets). More particularly, the geo-fencing identifies the location and time of the identified application activities.

The geo-fencing system uses the activity data to determine the number of users that performed a given action at a given location versus the total number of users at that given location. Based on this activity data, the geo-fencing system determines proximity scores for locations in which the application has been used. In other words, the geo-fencing system determines a probability that a client device having the application thereon will perform a particular application activity while within a proximity of a given location.

The geo-fencing system then identifies variation of the proximity scores over a geographic space to identify geographic regions of interest about which to place a geo-fence. In particular, the geo-fencing system identifies locations at which users are likely to perform an application activity related to the marketing goals based on the determined proximity scores across the locations. For example, in one or more embodiments, the geo-fencing system identifies a range of locations across which proximity scores generally exceed (e.g., on average) a threshold value. In particular, the geo-fencing system determines whether a proximity score exceeds a threshold proximity value associating with a higher likelihood that users of the user application are engaged in particular application activities when within the range of locations. In one or more embodiments, the geo-fencing system identifies the geographic regions of interest by learning a function (e.g., a distribution of the proximity scores) that identifies how the probability of the users performing a given action changes over a geographic area. The geo-fencing system uses the learned function to identify geographic areas that have peaks or high probabilities that users will perform an action there. The geo-fencing system then places geo-fences around these geographic areas.

In addition, the geo-fencing system dynamically modifies the boundaries of geo-fences. For example, the geo-fencing system updates or dynamically modifies the boundaries of the geo-fences over time or based on a change to the marketing goal. In particular, in one or more embodiments, the geo-fencing system tracks application activity over time to determine how the probabilities that a user will perform an action related to the marketing goal change over time. The geo-fencing system then dynamically modifies the geo-fences during a given time period to help ensure that the geo-fences stay located in geo-graphic areas that have peaks or high probabilities that users will perform an action there.

Thus, the geo-fencing system reduces inefficiencies of conventional geo-fencing by identifying and tracking activity data related to a promotable action or user behavior that furthers a defined goal. To illustrate, as will be described in further detail below, the geo-fencing system tracks application activities that are applicable to a number of different industries or categories, and generates geo-fences that are uniquely suited to promote user actions that are specific to a particular merchant, marketer, or other entity that are associated with those industries/categories. In this way, the geo-fencing system more efficiently targets populations of users at locations where users are particularly receptive to receiving marketing messages related to a particular type of business. Additionally, tracking activity data associated with respective user actions enables the geo-fencing system to generate multiple geo-fences related to different promotable actions (e.g., purchasing a product) or categories of promotable actions (e.g., purchasing sports-related products) that further a variety of marketing goals.

In addition, the geo-fencing system generates dynamic geo-fences that reflect changing activity data trends over time by tracking location data and time data for each detected instance of an application activity. For example, as will be described in further detail below, the geo-fencing system tracks and analyzes trends of activity data over time and dynamically updates boundaries of geo-fences to reflect changing trends. Thus, the geo-fencing system determines specific times of the day, week, or month that application activity is localized to various locations and generates geo-fences according to the changing locations of application activity over time. In this way, the geo-fencing system adapts to moving populations of users and targets on-the-go populations.

In both goal-driven (or action-driven) and dynamic generation of geo-fences, the geo-fencing system efficiently targets population of interested users while simultaneously avoiding unnecessary targeting of populations of irrelevant users. In this way, the geo-fencing system improves conversion rates of marketing communications as well as reduces user fatigue caused as a result of receiving frequent and/or irrelevant marketing communications. In other words, the geo-fencing system, through generation of the data-driven geo-fences, allows a marketer to send out fewer marketing communications without reducing conversion rates.

Figure 1B:
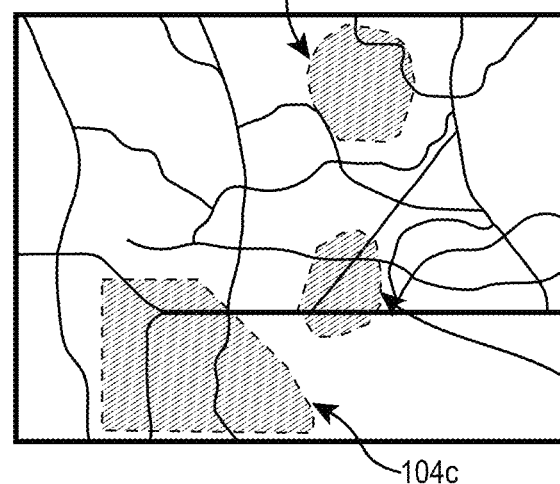

Additional detail will now be provided regarding the geo-fencing system in relation to illustrative figures portraying exemplary embodiments. For example, FIGS. 1A-1B illustrate example maps including exemplary data-driven geo-fences. For example, FIG. 1A illustrates a map 102 of a geographic region across which the geo-fencing system analyzes tracked activity data of client devices having a user application thereon. In one or more embodiments, the geo-fencing system limits analysis of activity data to a defined area (e.g., as shown in FIG. 1A). Alternatively, in one or more embodiments, the geo-fencing system tracks application activities of any client devices having the user application thereon across any range of locations.

As used herein, a "user application" refers to an application on a client device. For example, a user application may refer to a mobile application installed on a mobile device, such as mobile telephone, a tablet, a wearable device, etc. In one or more embodiments, the user application includes an application that runs in the foreground of a client device and involves direct user input with respect to the application. Alternatively, the user application can refer to an application that runs in the background of an operating system or as a plug-in to another application on the client device.

As used herein, "activity data" refers generally to information associated with one or more observable activities performed on client devices with respect to a user application operating on the client devices. For example, activity data refers to information associated with observable activities including, for example, one or more user inputs, a location of a client device, a time of the activity, and other information associated with the activity. Activity data can further include information accessible to the user application (e.g., via user permissions) including, for example, captured images, scanned barcode information, or contact lists, etc. As used herein, activity data can refer to a plurality of application activities performed by a plurality of client devices and/or using a plurality of user applications.

As used herein, "an application activity" or "instance of an application activity" refers to a defined and discrete observable activity performed by a client device using the user application thereon. In one or more embodiments, an application activity includes an identification of a defined activity in addition to information associated with the defined activity. For example, an application activity may refer to a user input or specific combination of user inputs as well as time and location information associated with the user input or specific combination of user inputs.

As mentioned above, the geo-fencing system tracks, or accesses, activity data of client devices across locations illustrated by the map 102 of FIG. 1A. Additionally, as shown in FIG. 1B, the geo-fencing system identifies geographic regions of interest and generate virtual geo-fences 104a-c around the identified geographic regions of interest. For example, the geo-fencing system tracks and analyzes activity data across the locations of the map 102 and identifies three geographic regions of interest within which users of the user application are likely perform one or more application activities (or categories of application activities). The geo-fencing system can further generate geo-fences 104a-c having boundaries around the identified geographic regions of interest.

It is appreciated that the geo-fencing system can generate any number of geo-fences 104a-c including boundaries around non-adjacent geographic regions of interest. For example, as shown in FIG. 1B, the geo-fencing system generates a first geo-fence 104a around a first geographic region of interest, a second geo-fence 104b around a second geographic region of interest, and a third geo-fence 104c around a third geographic region of interest. Additionally, as shown in FIG. 1B, the respective geo-fences 104a-c can have varying shapes and sizes depending on tracked activity data of client devices within or nearby the different geographic regions of interest.

It is appreciated that the geo-fencing system can generate geo-fences based on any number of tracked application activities of the user application(s) on respective client devices. As such, one or more embodiments described herein with regard to promoting actions related to furthering marketing goals of restaurants can similarly apply to promoting actions for other businesses or industries. Additionally, while one or more embodiments relate to tracking application activities and generating geo-fences associated with a particular action that furthers a marketing goal, it is appreciated that the geo-fencing system can track one or more application activities with regard to different actions or types of actions related to different marketing goals. Thus, as will be described in greater detail below, the geo-fencing system can track activities associated with different actions to promote and generate different geo-fences corresponding to the different user actions.

Figure 2:
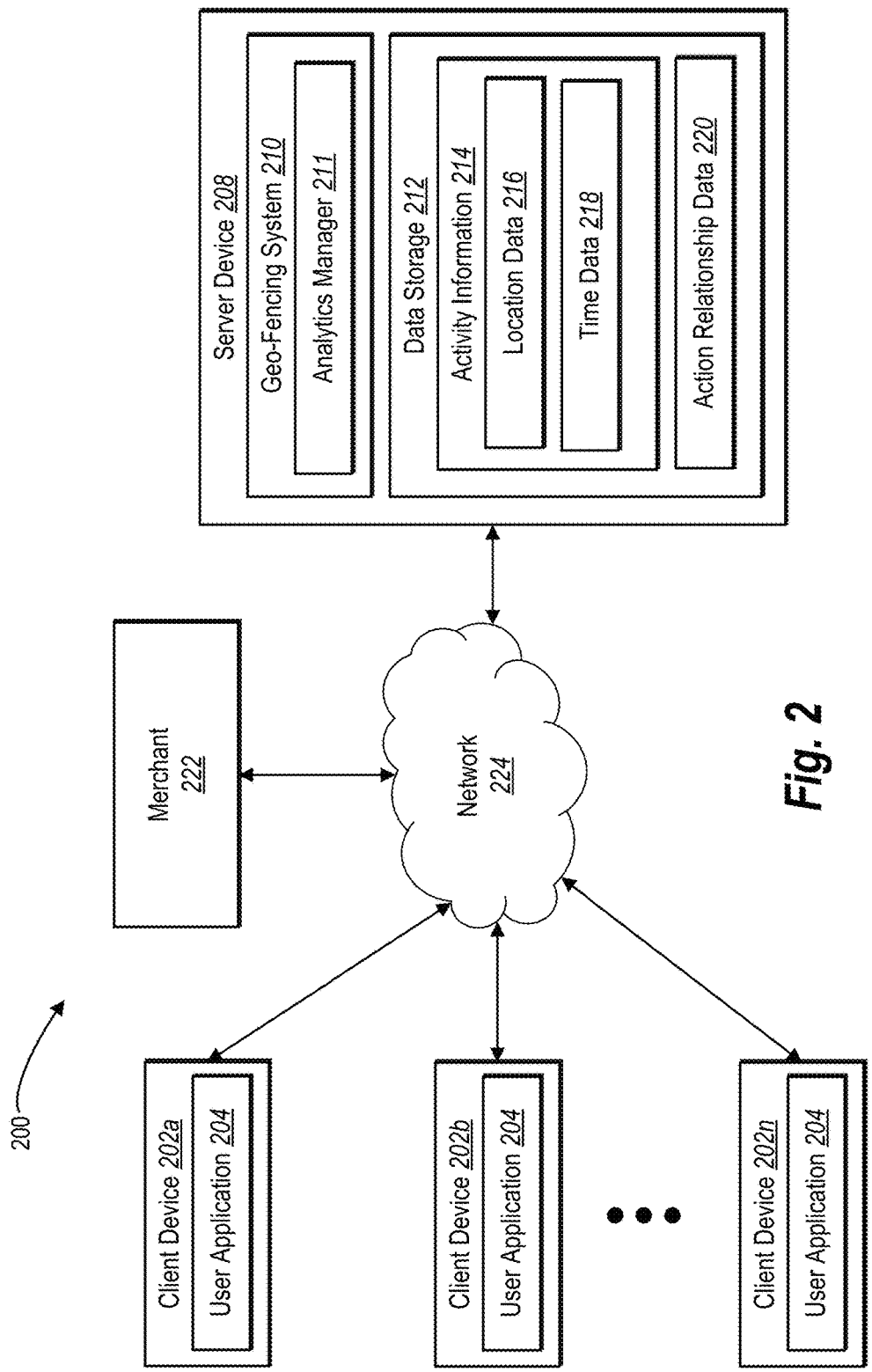
FIG. 2 illustrates a block diagram of an environment in which a geo-fencing system is implemented in accordance with one or more embodiments.

Additional detail will now be provided regarding an environment in which the geo-fencing system can be implemented. For example, FIG. 2 illustrates a schematic diagram illustrating an example environment 200 for performing the processes and features described herein. For example, as shown in FIG. 2, the environment 200 includes client devices 202a-n having a user application 204 thereon. Additionally, as shown in FIG. 2, the environment 200 includes a server device 208 including a geo-fencing system 210 having an analytics manager 211 thereon. As further shown, the server device 208 includes a data storage 212 including activity information 214, which includes location data 216 and time data 218. The data storage 212 further includes action relationship data 220. As shown in FIG. 2, the environment 200 further includes a merchant 222. The client devices 202a-n, server device 208 and merchant 222 can communicate via the network 224.

As mentioned above, the geo-fencing system 210 selectively tracks, or accesses, activity data of the user application 204 on client devices 202a-n across a range of locations. In one or more embodiments, the geo-fencing system 210 determines which application activities to track based on a particular action to promote (e.g., a user action or behavior that furthers a marketing goal). For example, the user action to promote can comprise an action that a markter associated with the user application 204 desires to user to perform. As not limiting examples, user actions to promote can include buying a product, downloading an mobile application, visiting a particular website, going out to eat at a particular restaurant, etc. As shown in FIG. 2, the data storage 212 includes action relationship data 220, which includes any number of associations between application activities by the user application 204 and one or more actions to promote (e.g., frequenting a restaurant) that facilitate a particular marketing goal (e.g., boosting profitability of the restaurant). Thus, the action relationship data 220 includes associations between one or more application activities and user actions to promote (e.g., related to particular marketing goals).

In one or more embodiments, the geo-fencing system 210 receives an indication of an action to promote (e.g., action relationship data 220) from a merchant 222. For example, where the merchant 222 is a restaurant owner, the merchant 222 may specify a marketing goal related to restaurants and indicate one or more related actions (e.g., purchasing a meal, placing a pickup order, dining in) that the merchant 222 desires to promote.

In one or more embodiments, the geo-fencing system 210 draws on a database of actions to promote and application activities associated with those actions. For example, where a merchant 222 is interested in promoting actions related to restaurants, the geo-fencing system 210 can lookup a listing of application activities associated with users frequenting restaurants (e.g., from the action relationship data 220). For instance, the geo-fencing system 210 identifies application activities such as performing a dining search and booking reservations using the user application 204 that are associated with actions including, for example, purchasing a meal, placing a pickup order, or dining in. In one or more embodiments, the geo-fencing system 210 associates an application activity with a specific goal. Alternatively, in one or more embodiments, the geo-fencing system 210 associates an application activity with a marketing goal that encompasses multiple user actions. Moreover, in one or more embodiments, the geo-fencing system 210 associates a category of multiple application activities with a promotable action or multiple actions.

Furthermore, while one or more embodiments involve identifying application activities associated with actions by looking up application activities previously determined to correspond to specific user actions (e.g., via a table), in one or more embodiments, the geo-fencing system 210 performs various steps to determine which application activities are associated with respective actions to promote. For example, as will be described in greater detail below in connection with FIG. 3, the geo-fencing system 210 identifies application activities that co-occur or otherwise correlate to respective actions performed by users that would further a marketing goal. In one or more embodiments, the geo-fencing system 210 stores the determined associations between application activities and user actions with other action relationship data 220 on the data storage 212.

As mentioned above, the geo-fencing system 210 tracks, or accesses, activity data of client devices having the user application thereon. In one or more embodiments, the merchant 222 collects activity data and provides the activity data to the server device 208. For instance, the merchant 222 can provide any or all activity data to the server device 208 and the geo-fencing system 210 can filter the activity data to identify any application activities associated with an action to promote. Alternatively, in one or more embodiments, the merchant 222 filters or otherwise identifies relevant activity data and selectively provides the activity data to the server device 208 for the geo-fencing system 210 (e.g., analytics manager 211) to analyze.

In one or more embodiments, the geo-fencing system 210 cooperates directly with the client devices 202a-n to collect and track activity data. For example, in one or more embodiments, the user application 204 collects activity data and provides the activity data to the server device 208. For example, the user application 204 can include tracking pixels, JavaScript or other code that notifies the server device 208 or an associated analytics server when the user application performs an application activity. Similar to the merchant 222 collecting activity data described above, the user application 204 can cause the client devices 202a-n to provide all activity data to the server device 208 for analytics manager 211 to filter or otherwise identify application activities associated with a promotable action. Alternatively, the user application 204 can filter the activity data and selectively provide activity data that is relevant to a particular promotable action.

It is appreciated that the user application 204 can have features and functionality that enable collecting activity data and providing the activity data to the server device 208 and/or merchant 222. Alternatively, in one or more embodiments, the client devices 202a-n includes a plug-in or other application that runs in connection with the user application 204 to cause the client devices 202a-n to collect, filter, and/or provide the activity data to the server device 208 for the analytics manager 211 to further analyze. For example, in one or more embodiments, the geo-fencing system 210 causes the server device 208 to provide a plug-in associated with the geo-fencing system 210 to the client devices 202a-n to install and run in the background of the user application 204 on the client devices 202a-n.

As mentioned above, the tracked activity data can include any information associated with a tracked application activity. For example, with each identified instance of a tracked application activity, the analytics manager 211 similarly tracks and stores associated information. As shown in FIG. 2, the activity information 214 includes location data 216 and time data 218. In one or more embodiments, the analytics manager 211 analyzes the activity information 214 to determine regions of interest including locations at which the client devices 202a-n more frequently perform certain application activities. In particular, the analytics manager 211 analyzes the tracked activity data to determine regions of interest within which users are more likely to engage in specific application activities than outside the regions of interest.

Figure 4:
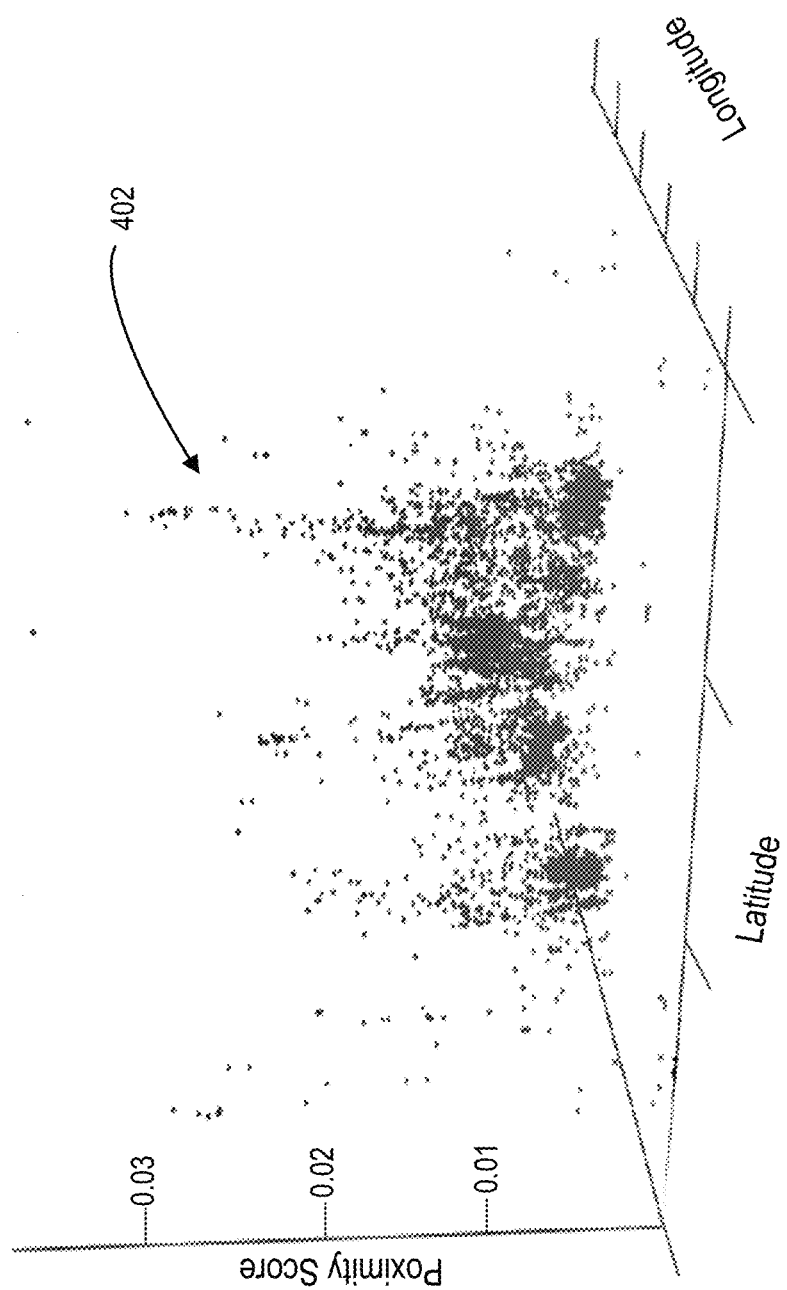
FIG. 4 illustrates a representation of determined proximity scores for tracked activities over a range of locations in accordance with one or more embodiments.

As will be explained in greater detail below in connection with FIGS. 4-6, the geo-fencing system 210 can analyze tracked application activities of the user application 204 across a range of locations (e.g., latitude and longitude coordinates). In one or more embodiments, the analytics manager 211 analyzes the tracked application activities by determining proximity scores associated with application activities across a range of locations. In particular, the analytics manager 211 determines proximity scores at various locations that indicate a probability that one of the client devices 202a-n having the user application 204 thereon will perform a particular application activity while at a location (or within a proximity of the location). In one or more embodiments, the analytics manager 211 determines a proximity score for each location across a range of multiple locations.

In addition, as will be explained in greater detail below in connection with FIGS. 4-6, the analytics manager 211 can generate a probability distribution for the determined proximity scores across the range of locations to determine predicted probabilities associated with whether a given client device would perform an application activity at a given location. For instance, the analytics manager 211 can analyze the determined proximity scores and identify regions of locations where the determined proximity scores generally exceed (e.g., on average) a threshold value, thus indicating a higher number of users engaged in a particular application activity while within the region(s) of locations. In one or more embodiments, the analytics manager 211 analyzes the determined proximity scores across a range of locations and generates a probability distribution (e.g., a prediction of predicted application usage) across the range of locations. The analytics manager 211 uses the probability distribution to identify one or more regions of interest at which it is more likely that a given user would perform an application activity or one of a category of application activities. As indicated above, the analytics manager 211 can identify these identified regions of interest associated with higher predicted probabilities of application activities as ideal locations for promoting certain user actions.

As used herein, a "geographic region of interest" refers to an identified location associated with a higher probability that a given user within a proximity of the identified location will perform an application activity. A geographic region of interest can refer to a range of multiple locations (e.g., latitude and longitude coordinates) defined by a boundary. In one or more embodiments, a geographic region of interest is defined by a range of GPS coordinates or the name of a location associated with a known geo-graphic location. Additionally, or alternatively, a geographic region of interest can refer to a single location (e.g., GPS coordinate) and all locations within a defined area surrounding the single location (or identified geo-graphic location). For example, a geographic region of interest can refer to a single location surrounded by a circle, square, or other defined shape surrounding the single location.

Upon identifying one or more geographic regions of interest, the geo-fencing system 210 generates geo-fences having boundaries around the identified geographic regions of interest. For example, as discussed above in connection with FIGS. 1A-1B, the geo-fencing system 210 generates one or multiple geo-fences around geographic regions of locations at which the geo-fencing system 210 has determined users to be likely to perform an application activity associated with a particular action.

In one or more embodiments, the geo-fencing system 210 generates geo-fences having different boundaries that change with time. For example, the geo-fencing system 210 determines probabilities and generates respective distributions of predicted probabilities for different periods of time and modifies resulting geo-fences in accordance with the changing behaviors of users at different time periods.

For example, in one or more embodiments, the geo-fencing system 210 analyzes discrete time periods (e.g., non-overlapping periods of time) and generates geo-fences for each discrete time period. For example, the geo-fencing system 210 modifies geo-fences between each discrete time period to reflect trends of usage of the user application 204 during each respective time period. Alternatively, in one or more embodiments, the geo-fencing system 210 analyzes trends of usage of the user application 204 over any number of time periods (e.g., including overlapping time periods) and determines one or more dynamic geo-fences over time. Further examples with regard to changing boundaries of geo-fences overtime are described in further detail below with regard to FIGS. 7A-7B.

Moreover, it is appreciated that the geo-fencing system 210 generates geo-fences based on incoming activity data. For example, while one or more embodiments may involve generating a geo-fence based on previously received activity data (e.g., test data), the geo-fencing system 210 can similarly modify or update geographic boundaries of interest based on incoming activity data from users of the client devices 202a-n. Thus, even without receiving a user input, the geo-fencing system 210 can automatically modify boundaries of geo-fences based on new activity data received from client devices 202a-n. Further, as will discussed in further detail below, the geo-fencing system 210 can similarly automatically update or modify geographic boundaries of geo-fences as application activities change between different periods of time.

Upon generating the geo-fences, the geo-fencing system 210 can utilize the geo-fences to facilitate delivery of one or more communications to client devices having the user application 204 that are currently within the geo-fence. For example, the geo-fencing system 210 causes the server device 208 to provide a marketing communication to client devices currently within a geo-fence. Alternatively, in one or more embodiments, the geo-fencing system 210 causes the server device 208 to communicate coordinates of a geo-fence to the merchant 222 to enable the merchant 222 to send a direct communication to client devices within the geo-fence.

The geo-fencing system 210 can utilize the generated geo-fences to provide communications to users in a variety of ways. For example, in one or more embodiments, the geo-fencing system 210 provides a communication to all client devices having the user application 204 at the same time. As another example, in one or more embodiments, the geo-fencing system 210 sends communications to client devices as they enter the geo-fence or as they exit (e.g., prior to exiting) the geo-fence. As another example, in one or more embodiments, the geo-fencing system 210 provides a communication to a client device determined to reside within the boundary of the geo-fence for a predetermined period of time.

Additionally, it is appreciated that the geo-fencing system 210 can facilitate delivery of different types of communications to various users. For example, the geo-fencing system 210 provides messages within the user application 204, push notifications, or other type of messages locally generated and delivered via the user application 204 on a respective client device. Alternatively, the geo-fencing system 210 provides a remote message including, for example, an email, a text, or message provided from the server device 208 to a client device to be delivered via the user application 204. In addition, the geo-fencing system 210 can provide messages in accordance with preference designated by specific users or settings of the user application 204. For example, a user may indicate a preference (e.g., within settings of the user application 204) to receive marketing communications via text messages, emails, push notifications, or whatever medium is convenient to a particular user.

Furthermore, one or more components of the geo-fencing environment 200 may, for example, be implemented as one or more stand-alone applications, as one or more modules of an application, as one or more plug-ins, as one or more library functions or functions that may be called by other applications, and/or as a cloud-computing model. Thus, one or more components of the geo-fencing environment 200 may be implemented as a stand-alone application, such as a desktop or mobile application. Furthermore, one or more components of the geo-fencing environment 200 may be implemented as one or more web-based applications hosted on a remote server. Alternatively or additionally, one or more components of the geo-fencing environment 200 may be implemented in a suite of mobile device applications or "apps." To illustrate, one or more components of the geo-fencing environment 200 may be implemented in one or a combination of different applications including, but not limited to ADOBE® ANALYTICS® and/or MOBILE SDK®. "ADOBE®," "ADOBE® ANALYTICS®" and/or "MOBILE SDK®" are either registered trademarks or trademarks of Adobe Systems Incorporated in the United States and/or other countries.

Additional features and functionality of the geo-fencing system 210 will now be described in connection with FIGS. 3-7B. For example, as mentioned above, the geo-fencing system 210 can identify application activities associated with an action to promote. For example, as shown in FIG. 3, the geo-fencing system 210 generates or accesses an activity table 300 of application activities associated with a particular category. For instance, as shown in FIG. 3, the activity table 300 includes categories (restaurants, rides, sales) of application activities associated with a user application 204 for a theme park experience. In one or more embodiments, the categories are associated with one or more related user actions. For example, the restaurant category can be associated with an action of dining at a restaurant, the rides category can be associated with an action of going on a particular ride, and the sales category can be associated with an action of purchasing merchandise.

As further shown in FIG. 3, the activity table 300 includes application activities of the user application 204 associated with each respective category. For example, as shown in FIG. 3, the restaurant category is associated with application activities including "Performing Dining Search," "Scanning Bar Code," "Purchasing Guest Pass," and "Booking Reservations." As further shown in FIG. 3, the rides category is associated with application activities including "Exploring Wait Times," "Purchasing Guest Pass," "Buying Ticket," "Expanding Ticket Detail," and "Claiming Ticket." As further shown in FIG. 3, the sales category is associated with application activities including "Reviewing Purchase," "Buying Product," "Buying Ticket," "Expanding Ticket Detail," and "Checking Guest Services."

As shown in FIG. 3, the different categories include different application activities that correlate with the respective categories or marketing goals. As mentioned above, the geo-fencing system 210 identifies application activities associated with one or more actions to promote. For example, as shown in FIG. 3, the geo-fencing system 210 associates each category of application activities with one or more respective actions. In one or more embodiments, the geo-fencing system 210 identifies each of the application activities for each category based on an association of the category with a related action.

The geo-fencing system 210 can identify each of the application activities for respective categories in a variety of ways. In one or more embodiments, the geo-fencing system 210 identifies application activities associated with a category by analyzing activity data and evaluating co-occurrences between instances of application activities and user actions that relate to the category. As an example, in one or more embodiments, the geo-fencing system 210 analyzes a set of test activity data including a set of application activities and determines rates at which particular types of application activities co-occur with one or more user actions related to the category.

To illustrate, a geo-fencing system 210 determines that users, who utilize a user application on a client device to search a product from an online store, often purchase the product from the online store using the user application 204. Accordingly, in one or more embodiments, the geo-fencing system 210 associates the application activity of searching a product from the online store with the action of purchasing products via the online store. Thus, when tracking application activity of the user application 204, the geo-fencing system 210 specifically tracks instances of client devices searching products via the user application 204.

The geo-fencing system 210 can determine correlations between application activities and actions using various models. For example, in one or more embodiments, the geo-fencing system 210 utilizes a deep learning model that determines rates of co-occurring application activities and user actions to identify those application activities that most closely correlate to respective user actions, marketing goals, or various categories. In particular, the geo-fencing system 210 can utilize hierarchical softmax, negative sampling techniques, or other deep-learning methods for determining correlation values and determining which application activities correlate to respective categories and/or user actions.

In addition, one or more embodiments of the geo-fencing system 210 identify a correlation score or metric that indicates a strength of correlation between the particular application activity and the associated action to promote. For example, the geo-fencing system 210 (or other third party system) can determine that some application activities strongly correlate with an associated action, and indicate a high probability that the user will perform the associated action soon after detecting the application activity. Conversely, the geo-fencing system 210 (or other system) can determine a weak or moderate correlation between an application activity and user action. Thus, the geo-fencing system 210 can assign or otherwise identify correlation values that indicate a strength of correlation between an application activity and associated user action.

Similar to one or more embodiments described above, the geo-fencing system 210 can determine a strength of correlation between application activities and associated actions in a variety of ways. For example, similar to identifying the correlation, the geo-fencing system 210 can also utilize the deep learning model including, for example, hierarchical softmax, negative sampling techniques, or other methods for determining the correlation or rate at which an application activity co-occurs with an associated action. In one or more embodiments, the geo-fencing system 210 assigns a value (e.g., between 0-1) that indicates a likelihood that an application activity causes, co-occurs, or otherwise correlates with an associated user action.

As shown in FIG. 3, the geo-fencing system 210 can further rank application activities within the respective categories. In one or more embodiments, the geo-fencing system 210 ranks the categories based on the strength of correlation between the application activities and user actions related to the particular category. For example, as shown in FIG. 3, the geo-fencing system 210 ranks the application activities based on a determined correlation value between an application activity and actions related to a particular category.

As shown in FIG. 3, the activity table 300 includes ranked application activities for each category based on a correlation score that indicates a level of correlation between a given application activity and actions related to the category. For example, with regard to the restaurant category, the "Performing Dining Search" application activity has a 0.60 correlation score with related actions, indicating a high level of correlation between "Performing Dining Search" application activity and actions related to the restaurant category. As further shown in FIG. 3, each of the application activities are ranked for each category in accordance with a correlation score indicating a level of correlation between each application activity and co-occurring actions.

As shown in FIG. 3, the activity table 300 lists different application activities for each respective category. Nonetheless, it is appreciated that one or more application activities can similarly relate to different categories. For example, as shown in FIG. 3, the application activity "Purchasing a Guest Pass" relates to both the restaurant and rides categories, but not the sales category. As further shown in FIG. 3, the application activity "Purchasing a Guest Pass" correlates more strongly to actions related to the rides category than to actions related to the restaurant category, which is reflected in the activity rankings for each category. As similarly shown in FIG. 3, the application activity "Buying a Ticket" relates to both the rides category and the sales category, but not the restaurant category.

As mentioned above, the geo-fencing system 210 can track activity data of client devices 202a-n having the user application 204 thereon to identify trends of application usage at different locations. For example, the geo-fencing system 210 identifies the locations (e.g., latitude and longitude) at which client devices performed a given application activity. The geo-fencing system 210 also identifies client devices at the location that include the user application that did not perform the given application activity.

The geo-fencing system 210 then determines a proximity score indicating a probability that users of client devices 202a-n having the user application thereon 204 will perform the given application activity at a given proximity to a given location. In particular, the geo-fencing system 210 determines proximity scores 402 that indicates a proportion or percentage of users who will perform one or more application activities at that particular location. It is appreciated that the proximity score for each location can refer to a proximity score for a particular application activity or category associated with one or more actions to promote.

Thus, the geo-fencing system 210 determines a proximity score across a range of multiple locations at which one or more application activities have been tracked. In determining the proximity scores for a particular category, it is appreciated that the geo-fencing system 210 can consider instances of different application activities within the particular category. Further, in one or more embodiments, the geo-fencing system 210 considers correlation values of each application activity with related actions to a particular category and applies more weight to application activities having higher correlation values than application activities having lower correlation values. For example, in determining proximity scores for the restaurant category, the geo-fencing system 210 can apply more weight to identified instances of "Performing a Dining Search" than to identified instances of "Booking a Reservation" using the user application 204. In one or more embodiments, the geo-fencing system 210 applies a weight to each application activity proportionate to a correlation score between the application activity and an action to promote (e.g., related to a particular category)

In one or more embodiments, the geo-fencing system 210 determines a proximity score that denotes a probability of users will perform an application activity at a particular location. Thus, in one or more embodiments, determining the proximity score involves determining a probability that a given client device 202a-n having the user application 204 thereon will perform an application activity at a location within a range of locations. Thus, where U represents a set of users (or client devices 202a-n) at a set of locations represented by L including a range of latitudes (Lat) and longitudes (Lon), the geo-fencing system 210 determines a proximity score for each location l∈L including a location pair (lat, lon) where lat∈Lat and lon∈Lon. In one or more embodiments, the geo-fencing system 210 determines the proximity score at each location using the following equation:

$$PS(l) = \frac{|\{(u \in U \mid A_u \in A_g \cap L_u \in P_l)\}|}{|\{u \in U \mid L_u \in P_l\}|}$$

where PS(l) denotes the probability of the users (or client devices 202a-n) performing an application activity ($A_u$) corresponding to an action ($A_g$) in proximity ($P_l$) of the location (l) and $L_u$ refers to the location of a user. It is appreciated that the proximity (P) can be set at any value determined to be within a proximity of a location coordinate. Thus, the proximity scores indicate predicted probabilities that a given client device having the user application thereon 204 will engage in an application activity within proximity to various locations. FIG. 4 illustrates proximity scores on the vertical axis assigned to locations (i.e., latitude-longitude pairs on the horizontal plane).

Using the proximity scores, the geo-fencing system 210 further generates a representation of predicted probabilities. For example, in one or more embodiments, the geo-fencing system 210 generates a distribution of predicted probabilities based on the proximity scores. For example, in one or more embodiments, the geo-fencing system 210 learns a spatial distribution function of the proximity scores for all locations (or a range of locations) with respect to application activities associated with an action or category of actions to promote. In one or more embodiments, the geo-fencing system 210 generates the spatial distribution function by fitting a smooth spline or localized joint polynomial function to the proximity scores. For example, the geo-fencing system 210 identifies variations of probability client devices performing one or more application activities over space and leverages the variations of probability to identify regions of interest where client devices having the user application 204 thereon are more likely to engage in one or more application activities. In one or more embodiments, the geo-fencing system 210 utilizes an equation smoothing technique as described in "Mixed GAM Computation Vehicle with GCV/AIC/REML Smoothness Estimation" by Simon Wood, which is incorporated by reference herein in its entirety.

Moreover, in one or more embodiments, the geo-fencing system 210 utilizes one or more likelihood-based regression models including, for example, a normal linear regression model and a linear logistic model which assume a linear (or other parametric) form for covariates (e.g., predictive variable). In one or more embodiments, the geo-fencing system 210 introduces a class of general additive models which replaces a linear form of the covariates by a smoothing function and applies a scatterplot smoother to generate a smooth distribution of the predicted probabilities over a geographic area. In one or more embodiments, the geo-fencing system 210 utilizes additive models for generating the predicted probability distribution as described in "Generalized Additive Models" by Trevor Hastie and Robert Tibshirani, which is incorporated by referenced herein in its entirety.

Figure 5A:
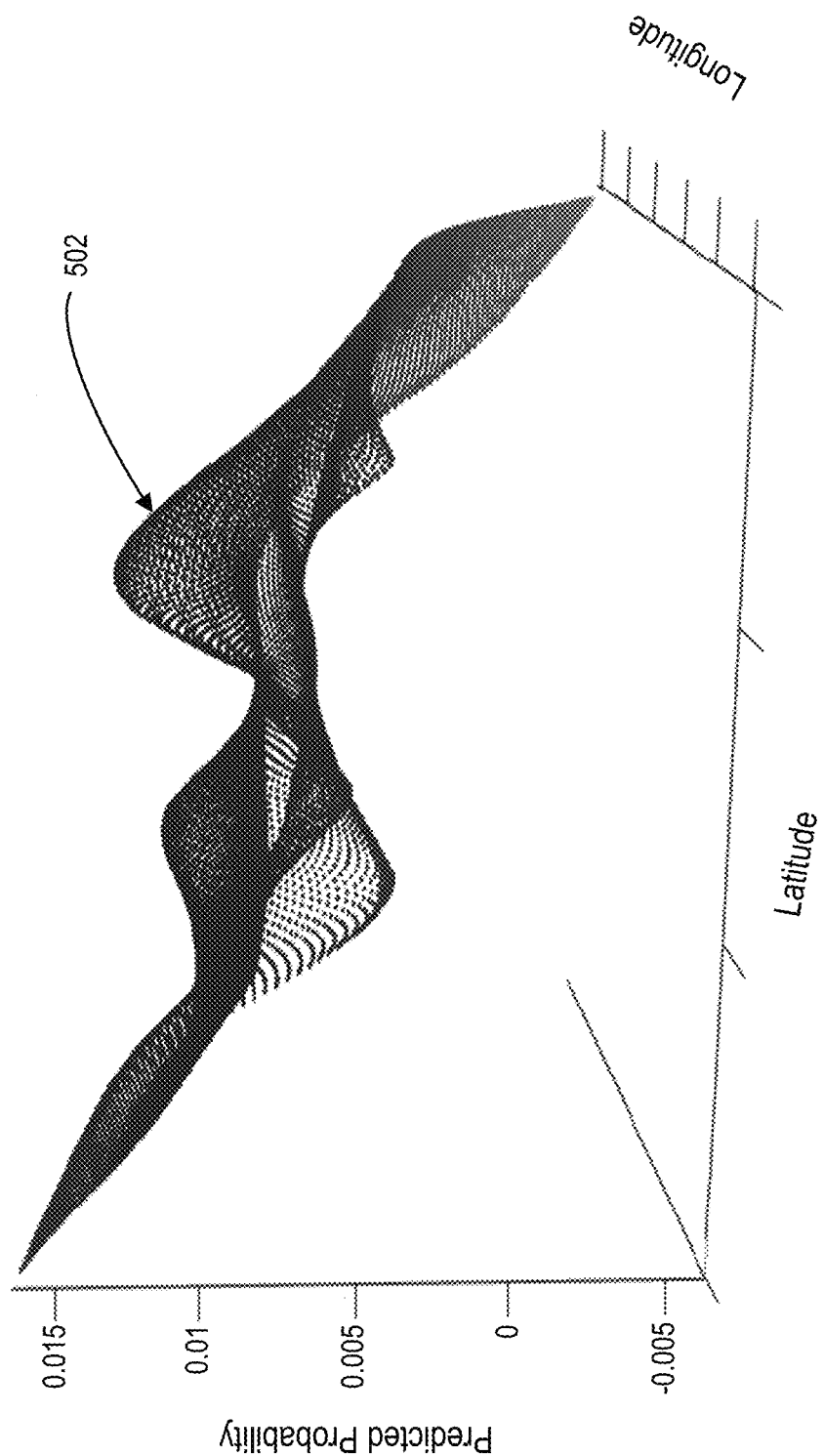
FIG. 5A illustrates an example spatial distribution of predicted application activities over the range of locations in accordance with one or more embodiments.

An example predicted probability distribution 502 is illustrated in FIG. 5A. It is appreciated that the predicted probability distribution 502 represents a spatial distribution function of the proximity scores 402 shown in FIG. 4. As shown in FIG. 5A, the predicted probability distribution 502 includes a continuous distribution of probability values that indicate a predicted probability that a user will engage in an application activity over a range of locations corresponding to the range of locations for which proximity scores 402 are determined. It is appreciated that the predicted probability distribution 502 can encompass a smaller range of locations than the range of locations for the determined proximity scores 402. Alternatively, the predicted probability distribution 502 can encompass the same range of locations as the range of locations for the determined proximity scores 402.

As mentioned above, the geo-fencing system 210 further determines the spatial distribution of predicted probabilities over time. For instance, the geo-fencing system 210 can generate a probability distribution for discrete time periods that indicates predicted probabilities that client devices having the user application 204 thereon will engage in a particular application activity (or category of application activities) during a discrete time period. In one or more embodiments, the geo-fencing system 210 generates the probability distribution for a time period based on determined proximity scores over the same time period.

Figure 5B:
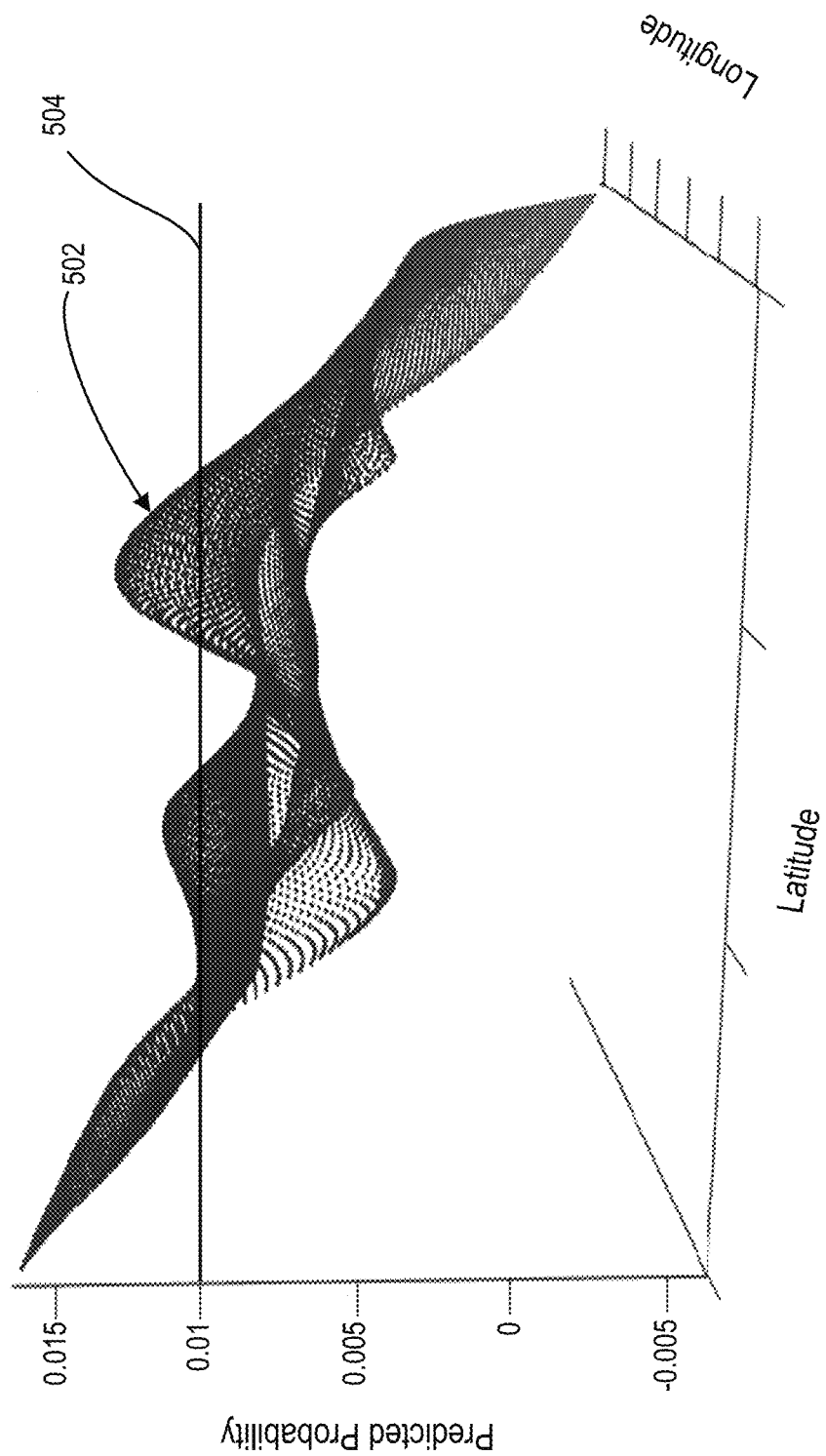
FIG. 5B illustrates the example spatial distribution of predicted application activities with regard to a threshold probability in accordance with one or more embodiments.

In one or more embodiments, the geo-fencing system 210 utilizes the predicted probability distribution 502 to identify one or more geographic regions of interest where client devices having the user application 204 thereon are likely to participate in an application activity (or category of application activities). For example, as shown in FIG. 5B, the geo-fencing system 210 can assign, select, or otherwise identify a threshold probability 504 and compare the values of the predicted probability distribution 502 to the threshold probability 504 to identify any locations at which the predicted probability values exceed the threshold probability 504.

Figure 6:
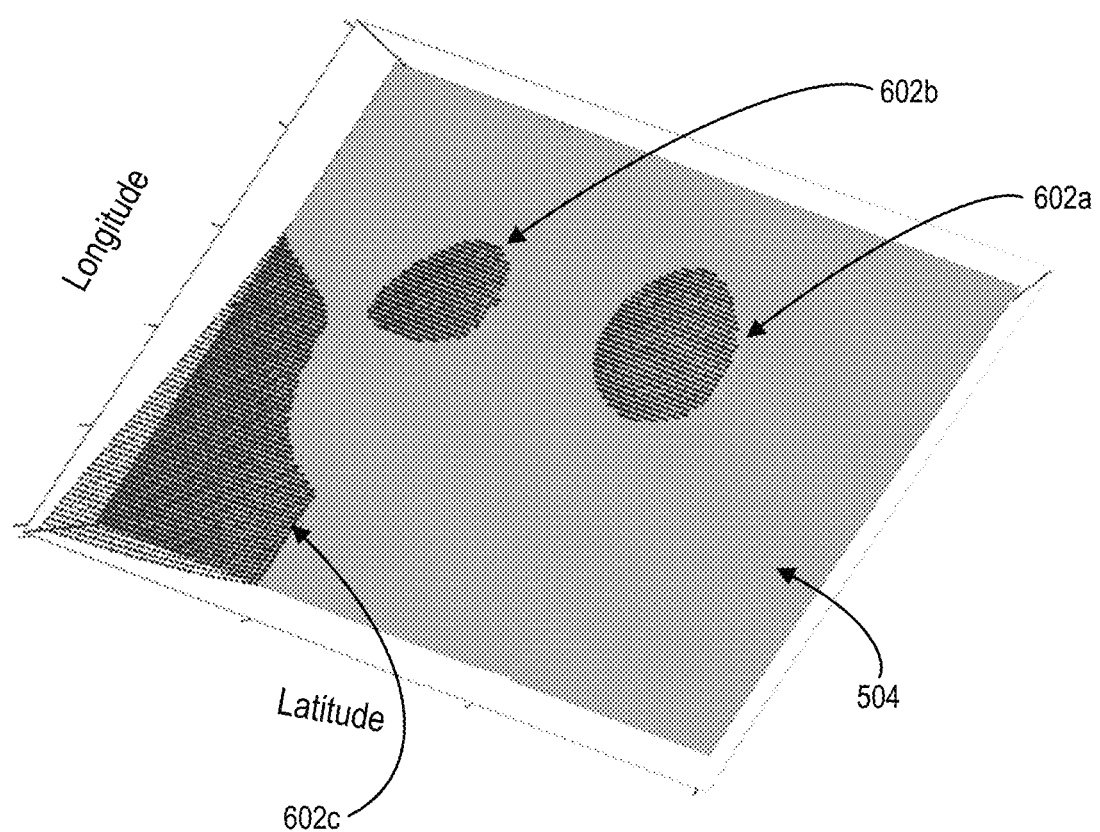
FIG. 6 further illustrates the example spatial distribution of predicted application activities with regard to the threshold probability in accordance with one or more embodiments.

FIG. 6 illustrates a top view of the predicted probability distribution 502, showing geographic regions of interest 602a-c at which values of the predicted probability distribution 502 exceed the threshold probability 504. For example, as shown in FIG. 6, based on the proximity scores 402 generated from tracked application activities of the client devices 202a-n having the user application 204 thereon, the geo-fencing system 210 identifies a first geographic region of interest 602a, a second geographic region of interest 602b, and a third geographic region of interest 602c. Each geographic region of interest defines ranges of latitudes and longitudes where the values of the predicted probability distribution 502 exceed the threshold probability 504.

In one or more embodiments, the geo-fencing system 210 adjusts the threshold probability 504 to include larger or smaller geographic regions of interest (or to achieve a target conversion rate for sending marketing messages). For example, where the geo-fencing system 210 fails to identify any geographic regions of interest where the predicted probability distribution exceeds the threshold probability 504, the geo-fencing system 210 can assign or identify a lower threshold probability 504 that causes more values of the predicted probability distribution 502 to exceed the threshold probability 504. Alternatively, if the geo-fencing system 210 identifies too many geographic regions of interest or too large of a geographic region of interest, the geo-fencing system 210 can increase the threshold probability 504 to identify fewer or smaller geographic regions of interest.

In one or more embodiments, the geo-fencing system 210 increases or decreases the threshold probability 504 over time. For example, where a threshold probability 504 effectively identifies geographic regions of interest during a peak time of application usage, the threshold probability 504 may fail to identify any ranges of locations during a lull in application usage. Based on changing trends of application usage, the geo-fencing system 210 can increase or decrease the threshold probability 504 to effectively identify geographic regions of interest during peaks and lulls of application usage.

In addition to the foregoing, the geo-fencing system 210 dynamically modifies a geo-fence over time. For example, the geo-fencing system 210 determines that detected instances of application activities related to dining at restaurants (e.g., booking reservations, dining searches) spikes in frequency every Saturday night at around 6:00 pm nearby an event venue (e.g., a stadium). As such, the geo-fencing system identifies a geographic region of interest around the event venue and generates a geo-fence around the event venue at around 6:00 pm (e.g., 1 hour before an event at the event venue). Additionally, where the geo-fencing system determines that the frequency of application activities decreases after 7:00 pm (e.g., after an event at the event starts) nearby the event venue, the geo-fencing system removes or otherwise modifies the geo-fence to reflect the decreased frequency of the tracked application activity.

More particularly, the geo-fencing system 210 parameterizes the spatial distribution function over time. The geofencing system 210 analyzes the spatial distribution function for different time intervals to capture how the application activities change with time. In other words, the geo-fencing system 210 identifies application activity for a given time period. The geo-fencing system 210 uses the identified application data to generate proximity scores for the given time period. The geo-fencing system 210 further generates a predicted probability distribution 502 for the given time period. The geo-fencing system 210 then identifies a geo-fence based on the predicted probability distribution 502 for the time period. The geo-fencing system 210 repeats the foregoing for a plurality of time periods. The geo-fencing system 210 then dynamically changes the geo-fences over time. For example, the geo-fencing system 210 uses a first geo-fence generated using data from a first time period during the first time period. The geo-fencing system 210 then uses a second geo-fence generated using data from the second time period during the second time period.

Figure 7A:
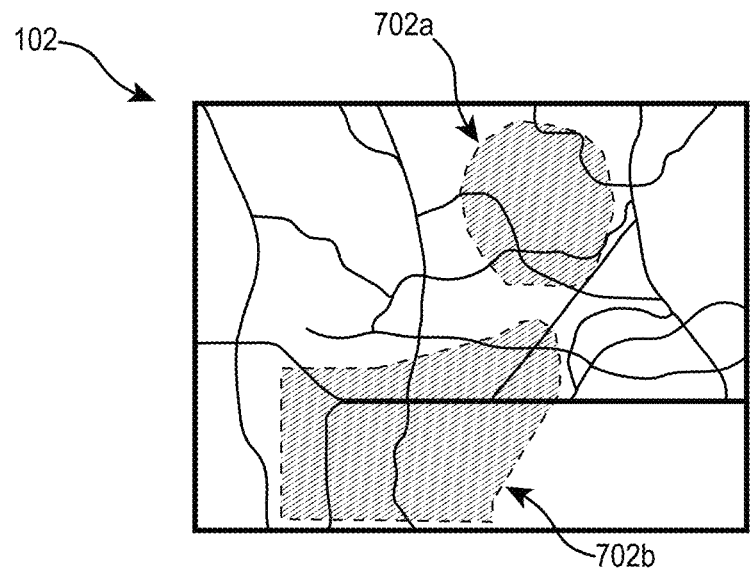
FIGS. 7A-7B illustrate examples of dynamic geo-fences on a map in accordance with one or more embodiments.
Figure 7B:
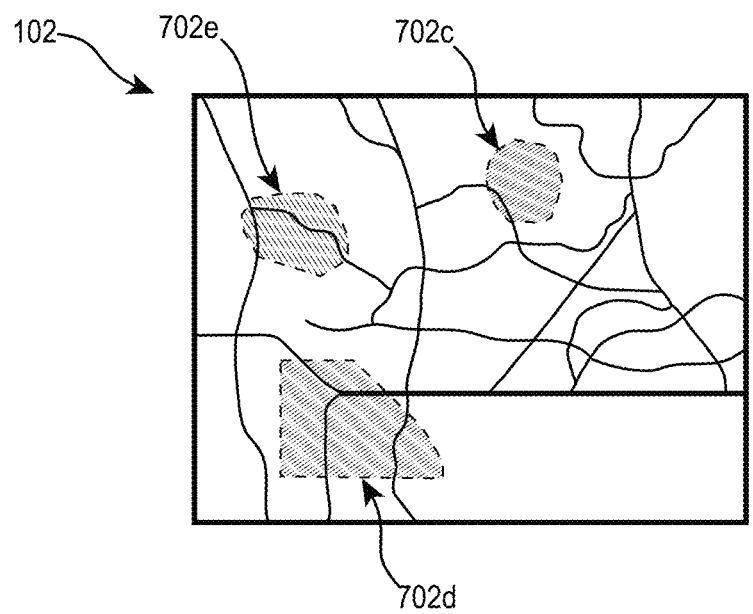

As a further illustration of dynamically changing geo-fences, FIGS. 7A and 7B illustrate modified boundaries of the geo-fences described above in connection with FIGS. 1A and 1B. For example, in one or more embodiments, the geo-fencing system 210 identifies different or modified geographic regions of interest for different periods of time based on changing application activity or movement of client devices 202a-n participating in various application activities. Based on the changing geographic regions of interest, the geo-fencing system modifies existing geo-fences or creates new geo-fences that reflect the changing application activities over time. Further, in one or more embodiments, the geo-fencing system 210 updates or otherwise changes the boundaries of the geo-fences without receiving user input for each update or modification.

For example, FIGS. 7A and 7B illustrate possible modifications of the geographic regions of interest across the map discussed above in connection with FIGS. 1A and 1B. In particular, FIGS. 7A and 7B illustrate geo-fences that reflect activity data across locations of the map 102 at two different time periods. For example, FIG. 7A illustrates geo-fences 702a-b over a first time period, and FIG. 7B illustrates geo-fences 702c-e over a second time period.

In particular, FIG. 7A shows a first geo-fence 702a and a second geo-fence 702b over two non-adjacent portions of the map 102. In one or more embodiments, the geo-fences 702a-b represent geographic regions of interest associated with a marketing goal of promoting restaurants (or user actions associated with promoting restaurants). In addition, the geo-fences 702a-b may represent higher frequency of restaurant-related application activity (of the user application 204) during a time period right before dinner. As such, the geo-graphic regions of interest may enclose a large portion of the map to reflect an increase in the number of users of the user application 204 that are performing activities such as "Performing a Dining Search," "Scanning A Bar Code," "Booking a Reservation," or other related application activities that tend to co-occur with user actions that promote or otherwise benefit restaurants.

For example, in one or more embodiments, FIG. 7A represents an increase in application activity (of the user application 204) between (a) a time period associated with the geo-fences 104a-c of FIG. 1B and (b) a time period associated with the geo-fences 702a-b of FIG. 7A. As such, in one or more embodiments, the geo-fences 702a-b illustrate enlarged boundaries of the geographic region of interest based on an increase of relevant application activities during the time period associated with FIG. 7A.

FIG. 7B illustrates another example of geo-fences 702c-e over three non-adjacent portions of the map 102. In one or more embodiments, FIG. 7B represents modified geo-fences 702c-e based on a change in detected application activity by various users over time. As an example, where FIG. 7A represents geo-fences 702a-b associated with application activities that relate to restaurants over a first time period (e.g., before or during peak dinner hours), FIG. 7B may represent modified geo-fences 702c-e associated with application activities that relate to restaurants over a second time period (e.g., after peak dinner hours). Thus, the geo-fences 702c-e may represent a different demographic of users of the user application 204 that eat later than users that eat during peak dinner hours.

As another example where the geo-fences 702a-b of FIG. 7A represent users performing application activities related to booking reservations and eating dinner, the geo-fences 702c-e of FIG. 7B may represent users performing application activities related to eating dessert. As such, the boundaries of the first and second geo-fences 702c-d of FIG. 7B may simply refer to modified boundaries of the first and second geo-fences 702a-b of FIG. 7A. Moreover, the third geo-fence 702e refers to a newly generated geo-fence unique to the time period of FIG. 7B centered around one or more locations where users can buy dessert.

Alternatively, rather than representing geo-fences associated with the same marketing goal or promotable user action over two different periods of time, FIG. 7A may represent geo-fences 702a-b associated with a first category or action to promote and FIG. 7B may represent geo-fences 702c-e associated with a second category or action to promote. In particular, even where FIGS. 7A and 7B include geo-fences 702a-e over the same time period, it is appreciated that the geo-fencing system 210 can generate different geo-fences 702a-e associated with different actions or categories of actions to promote. Thus, the geo-fencing system 210 can selectively provide different communications to different users within the geo-fences based on whether the geo-fences are associated with a particular category of actions or marketing goals.

Using one or more embodiments described herein, the geo-fencing system 210 can more precisely target users of the user application 204 that are engaged in application activities pertaining to various goals and promotable actions. As discussed above, correctly targeting users of the user application improves the user experience. Indeed, upon training the geo-fencing system 210 to perform one or more embodiments described herein, a measurement of precision for a test group of users targeted using geo-fencing techniques described herein was compared to one or more conventional methods for targeting users of the user application 204.

For example, a precision value is defined as:

$$\text{Precision} = \frac{\text{Number of Correctly Targeted Users}}{\text{Number of Users Targeted}}$$

where the number of correctly targeted users refers to those targeted with a communication while engaged in an application activity related to a particular marketing goal. Using this formula, it was determined that targeting the test group of users using the geo-fencing system 210 resulted in a Precision value approximately 20% higher than conventional methods for targeting a user base of application users. In particular, targeting users using one or more embodiments described herein was approximately 20% more effective than targeting users generally or, alternatively, targeting users within a geo-fence determined based on population density. Thus, one or more embodiments of the geo-fencing system 210 minimizes the number of people wrongly targeted, thus re-enforcing the effectiveness of one or more embodiments of the geo-fencing system 210 described herein.

Along similar lines, dynamically modifying the geo-fence based on changing application activity over time improved the precision of targeting users of the user application 204. In particular, the geo-fencing system 210 incorrectly targeted substantially fewer users of the user application 204 than conventional methods for targeting users of the user application. For example, using the same activity data from the test group of users to determine the precision value above, it was determined that less than 2000 users were targeted incorrectly using one or more embodiments of the geo-fencing system 210 described herein. Using this same activity data from the test group, it was determined that more than 10,000 users were targeted incorrectly using geo-fences defined based on population density. It was also determined than more than 12,000 users were targeted incorrectly by targeting all users of the user application 204 generally. Thus, in addition to more precisely targeting relevant users, the geo-fencing system 210 substantially reduces the number of incorrectly targeted users of the user application 204.

FIGS. 1A-7B, the corresponding text, and the examples, provide a number of different systems and devices that allows the geo-fencing system 210 to generate a geo-fence based on activity data of a user application 204. In addition to the foregoing, embodiments can also be described in terms of flowcharts comprising acts and steps in a method for accomplishing a particular result. For example, FIGS. 8-9 illustrates flowcharts of exemplary methods in accordance with one or more embodiments.

Figure 8:
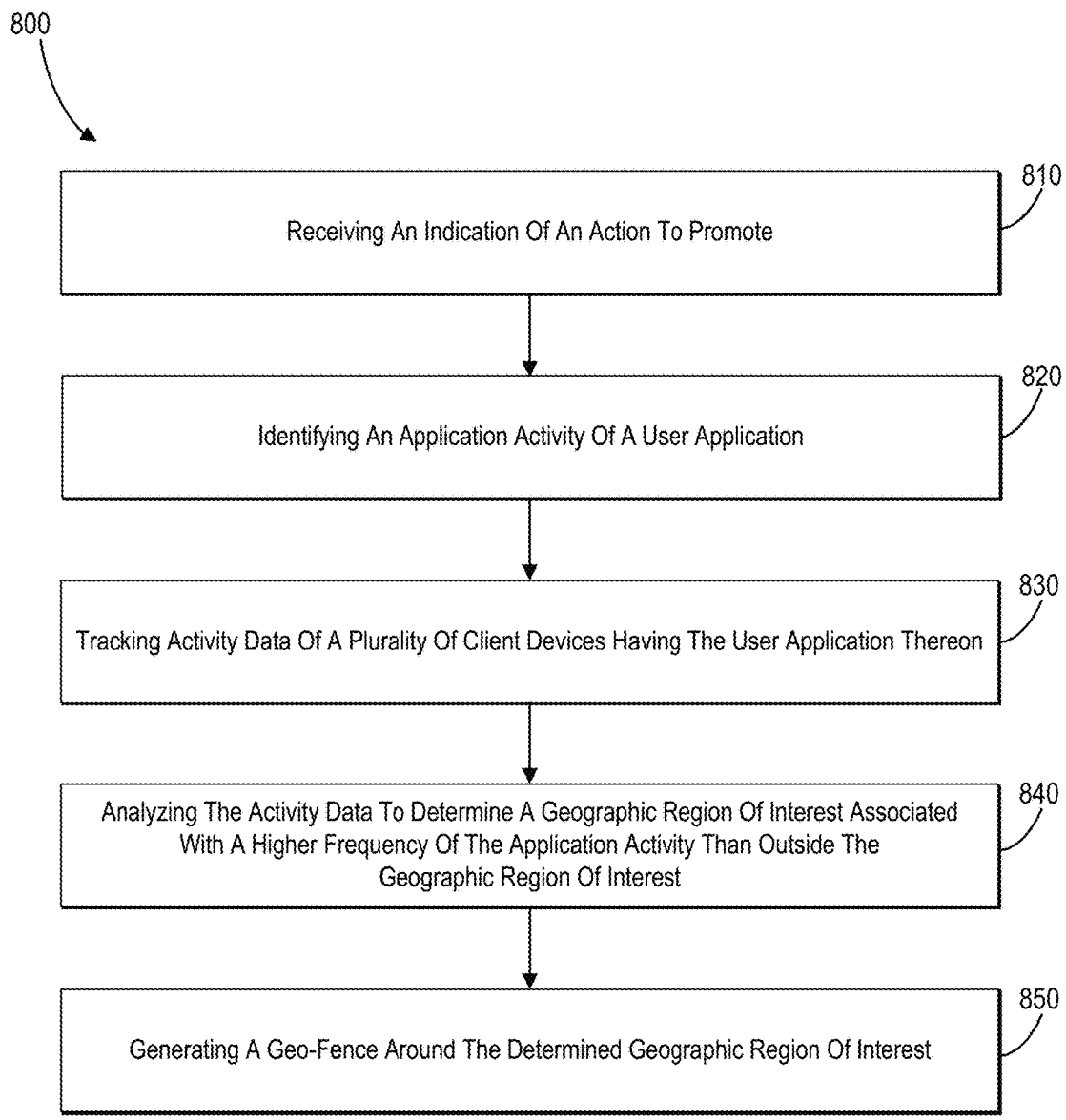
FIG. 8 illustrates a flow diagram of an example method for generating a geo-fence in accordance with one or more embodiments.
Figure 9:
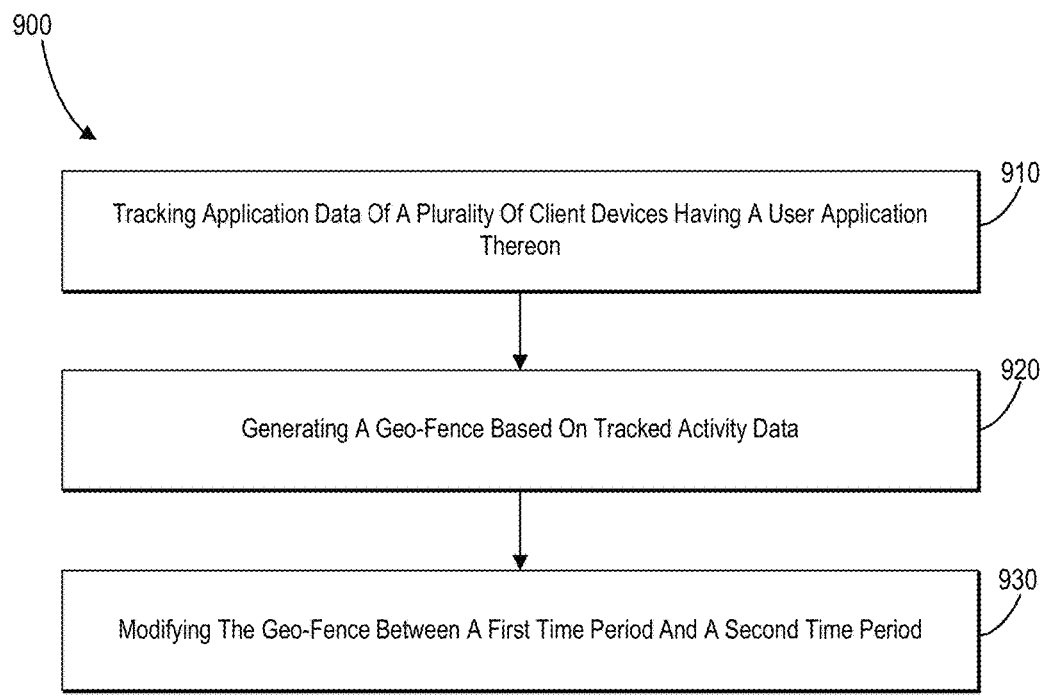
FIG. 9 illustrates a flow diagram of another example method for generating a geo-fence in accordance with one or more embodiments.

FIG. 8 illustrates a flowchart of one example method 800 for generating a data-driven geo-fence. For example, the method 800 relates to dynamically defining a virtual boundary based on activity data of a plurality of client devices 202a-n having a user application 204 thereon. As shown in FIG. 8, the method 800 includes an act 810 of receiving an indication of an action to promote. In one or more embodiments, receiving the indication of an action to promote involves receiving an indication or request from a merchant 222, marketer, or other entity to promote one or more actions that further a particular marketing goal.

As further shown in FIG. 8, the method 800 includes an act 820 of identifying an application activity of a user application 204. In particular, in one or more embodiments, the act 820 involves identifying an application activity of a user application 204 associated with the action to promote. In one or more embodiments, identifying the application activity involves looking up application activities (e.g., from an activity table 300) associated with a particular category or action(s) to promote. Alternatively, in one or more embodiments, identifying the application activity involves identifying a correlation between a client device performing the application activity and a user of the client device performing the action to promote. For example, identifying the application activity associated with the action to promote may involve determining a correlation score for an application activity based on how often the application activity co-occurs with the promotable action.

As further shown in FIG. 8, the method 800 includes an act 830 of tracking activity data of a plurality of client devices 202a-n having the user application 204 thereon. For example, in one or more embodiments, the act 830 involves tracking activity data of a plurality of client devices 202a-n having the user application 204 thereon where the activity data includes instances of the application activity and an associated location for each instance of the application activity. In one or more embodiments, tracking the activity data involves tracking activity data of the plurality of client devices 202a-n over a defined range of locations.

In one or more embodiments, tracking the activity data involves receiving a collection of activity data (e.g., from a merchant 222 or client devices 202a-n). In addition, in one or more embodiments, tracking the activity data involves filtering the collection of activity data to identify a subset of application activities of the activity data including instances of the application activity of the user application 204 associated with the action to promote. Alternatively, in one or more embodiments, tracking the activity data involves receiving filtered activity data (e.g., from the merchant 222 or client device 202a-n) including the instances of the application activity associated with the action to promote while excluding other application activities not previously determined to be associated with the action to promote.

As further shown in FIG. 8, the method 800 includes an act 840 of analyzing the activity data to determine a geographic region of interest associated with a higher frequency of the application activity than outside the geographic region of interest. As further shown in FIG. 8, the method 800 includes an act 850 of generating a geo-fence around the geographic region of interest. For example, in one or more embodiments, the act 850 involves generating a geo-fence having a boundary around the geographic region of interest.

In one or more embodiments, analyzing the activity data to determine the geographic region of interest involves determining a proximity score for each location across a plurality of locations. The proximity score indicates a proportion of the plurality of client devices 202a-n that performed the application activity while at each location across the plurality of locations. In one or more embodiments, the determining the proximity score further involves plotting proximity scores for each location across the plurality of locations defined by a range of latitude and longitude coordinates.

In one or more embodiments, analyzing the activity data to determine the geographic region interest further involves generating a distribution of predicted probabilities (e.g., predicted probability distribution 502) based on the proximity scores for each location across the plurality of locations. In one or more embodiments, the distribution of predicted probabilities indicates a probability at each location of the plurality of locations that a given client device at each location (or within a proximity of each location) would perform the application activity.

In one or more embodiments, analyzing the activity data to determine the geographic region of interest involves identifying ranges of locations of the plurality of locations where the distribution of predicted probabilities exceeds a predicted probability threshold 504. Further in one or more embodiments, generating the geo-fence involves defining the boundary of the geo-fence around the ranges of locations of the plurality of locations where the distribution of predicted probabilities exceeds the predicted probability threshold 504.

In one or more embodiments, the activity data includes an associated time (e.g., a time stamp) for each instance of the application activity. Further, in one or more embodiments, analyzing the activity data to determine the geographic region of interest involves determining the geographic region of interest for a first time period based on tracked activity data limited to instances of the application activity having an associated time within the first time period. In addition, in one or more embodiments, analyzing the activity data to determine the geographic region of interest involves determining a second region of interest for a second time period based on tracked activity data limited to instances of the application activity having an associated time within the second time period.

In one or more embodiments, the method 800 involves generating the geo-fence for the first time period having the boundary around the region of interest. In addition, in one or more embodiments, the method 800 involves generating another geo-fence for the second time period including a modified boundary around the second geographic region of interest. Further, in one or more embodiments, the method 800 involves generating second (or third) geo-fence including a respective boundary around a non-adjacent geographic region of interest from the boundary around the geographic region of interest.

Moreover, in one or more embodiments, the method 800 involves providing a communication to one or more client devices having the user application 204 thereon that are determined to be located within the boundary of the geo-fence. In one or more embodiments, the method 800 involves determining that a client device having the user application 204 thereon is located within the boundary of the geo-fence. In response to determining that the client device having the user application 204 thereon is located within the boundary of the geo-fence, the method 800 can further include providing a communication to the client device using the user application 204 (e.g., in-application message, push notification).

FIG. 9 illustrates a flowchart of another example method 900 for generating one or more data-driven geo-fences. For example, as shown in FIG. 9, the method 900 includes an act 910 of tracking application data of a plurality of client devices 202a-n having a user application 204 thereon. For example, in one or more embodiments, the act 910 involves tracking activity data of a plurality of client devices 202a-n having the user application 204 thereon. In one or more embodiments, the activity data includes instances of an application activity and associated time and location for each instance of the application activity. In one or more embodiments, the method 900 further includes receiving an indication of an action to promote and identifying that the application activity is associated with the action to promote. Further, in one or more embodiments, tracking the activity data involves selectively tracking instances of the application activity associated with the action to promote.

As further shown in FIG. 9, the method 900 includes a step 920 of generating a geo-fence based on tracked activity data. In one or more embodiments, the step 920 involves generating a geo-fence based on the tracked activity data where the geo-fence includes a boundary around a geographic region of interest within which a first plurality of users of the plurality of client devices have a higher probability to perform the application activity than a second plurality of users of the plurality of client devices outside the geographic region of interest. For example, the method 900 can include an act of analyzing the application data over time to determine geographic regions of interest associated with a higher frequency of an application activity (e.g., application activity associated with an action to promote) than outside the geographic regions of interest. For example, in one or more embodiments, the method 900 includes analyzing the activity data to determine geographic regions of interest over time within which users of the plurality of client devices 202a-n perform the application activity more frequently than users of the plurality of client devices 202a-n outside the determined geographic regions of interest. In one or more embodiments, the act 930 involves analyzing the activity data to determine geographic regions of interest over time within which users of the plurality of client devices have a threshold probability to perform the application activity (or one or more related application activities).

In addition, in one or more embodiments, the method 900 includes an act of generating a geo-fence for a first time period based on a first determined geographic region of interest for the first time period. For example, in one or more embodiments, the method 900 involves generating a geo-fence for a first time period by defining a boundary of the geo-fence around a first determined geographic region of interest based on the tracked activity data for the first time period.

As described in additional detail above, in one or more embodiments, generating the geo-fence involves analyzing the activity data to determine a proximity score across a range of locations associated with tracked instances of the application activity. For example, in one or more embodiments, generating the geo-fence involves determining a proximity score using the following equation:

$$PS(l) = \frac{|\{(u \in U \mid A_u \in A_g \cap L_u \in P_l)\}|}{|\{u \in U \mid L_u \in P_l\}|}$$

where PS(l) denotes the probability of the users (or client devices 202*a-n*) performing an application activity ($A_u$) corresponding to an action ($A_g$) in proximity ($P_l$) of the location (l) and $L_u$ refers to the location of a user.

In addition, as described in detail above, in one or more embodiments, generating the geo-fence involves analyzing the calculated proximity scores to generate (e.g., calculate) a distribution of predicted probabilities based on the proximity scores. For example, in one or more embodiments, generating the geo-fence involves learning a spatial distribution function of the proximity scores for all locations (or a range of locations) with respect to application activities associated with an action or category of actions to promote. In one or more embodiments, generating the geo-fence involves generating the spatial distribution function by fitting a smooth spline or localized joint polynomial function to the proximity scores. For example, generating the geo-fence can involve identifying variations of probability client devices performing one or more application activities over space and leverages the variations of probability to identify regions of interest where client devices having the user application 204 thereon are more likely to engage in one or more application activities. In one or more embodiments, generating the geo-fence involves utilizing equation smoothing techniques as described in "Mixed GAM Computation Vehicle with GCV/AIC/REML Smoothness Estimation" by Simon Wood, which is incorporated by reference herein in its entirety.

As another example, in one or more embodiments, generating the geo-fence involves utilizing one or more likelihood-based regression models including, for example, a normal linear regression model and a linear logistic model which assume a linear (or other parametric) form for covariates (e.g., predictive variable). In one or more embodiments, generating the geo-fence involves introducing a class of general additive models which replaces a linear form of the covariates by a smoothing function and applies a scatterplot smoother to generate a smooth distribution of the predicted probabilities over a geographic area. In one or more embodiments, generating the geo-fence involves utilizing additive models for generating the predicted probability distribution as described in "Generalized Additive Models" by Trevor Hastie and Robert Tibshirani, which is incorporated by referenced herein in its entirety.

As further shown in FIG. 9, the method 900 includes an act 930 of generating a geo-fence based on tracked application data. For example, in one or more embodiments, the act 930 includes modifying the geo-fence between a first time period and a second time period by adjusting the boundary of the geo-fence based on a difference between the tracked activity for the first time period and the tracked activity for the second time period. For example, in one or more embodiments, the method 900 includes an act 940 of modifying the geo-fence for a second time period based on a second determined geographic region of interest for the second time period. For example, in one or more embodiments, the act 940 involves modifying the geo-fence for a second time period by adjusting the boundary of the geo-fence to be around a second determined geographic region of interest based on the tracked activity data for the second time period.

In one or more embodiments, modifying the geo-fence involves enlarging the boundary of the geo-fence from the first time period to the second time period to reflect a higher frequency of tracked instances of the application activity within a proximity of the boundary of the geo-fence for the first time period. Alternatively, in one or more embodiments, modifying the geo-fence involves shrinking the boundary of the geo-fence from the first time period to the second time period to reflect a lower frequency of tracked instances of the application activity within a proximity of the boundary of the geo-fence for the first time period. Further, in one or more embodiments, the method 900 includes generating a new geo-fence for the second time period having a non-adjacent boundary to the boundary of the modified geo-fence.

Moreover, in one or more embodiments, the method 900 includes providing a first communication during the first time period to any client devices having the user application 204 thereon and determined to be located within the boundary of the geo-fence during the first time period. In addition, in one or more embodiments, the method 900 includes providing a second communication during the second time period to any client devices having the user application 204 thereon and determined to be located within the boundary of the modified geo-fence during the second time period.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 10:
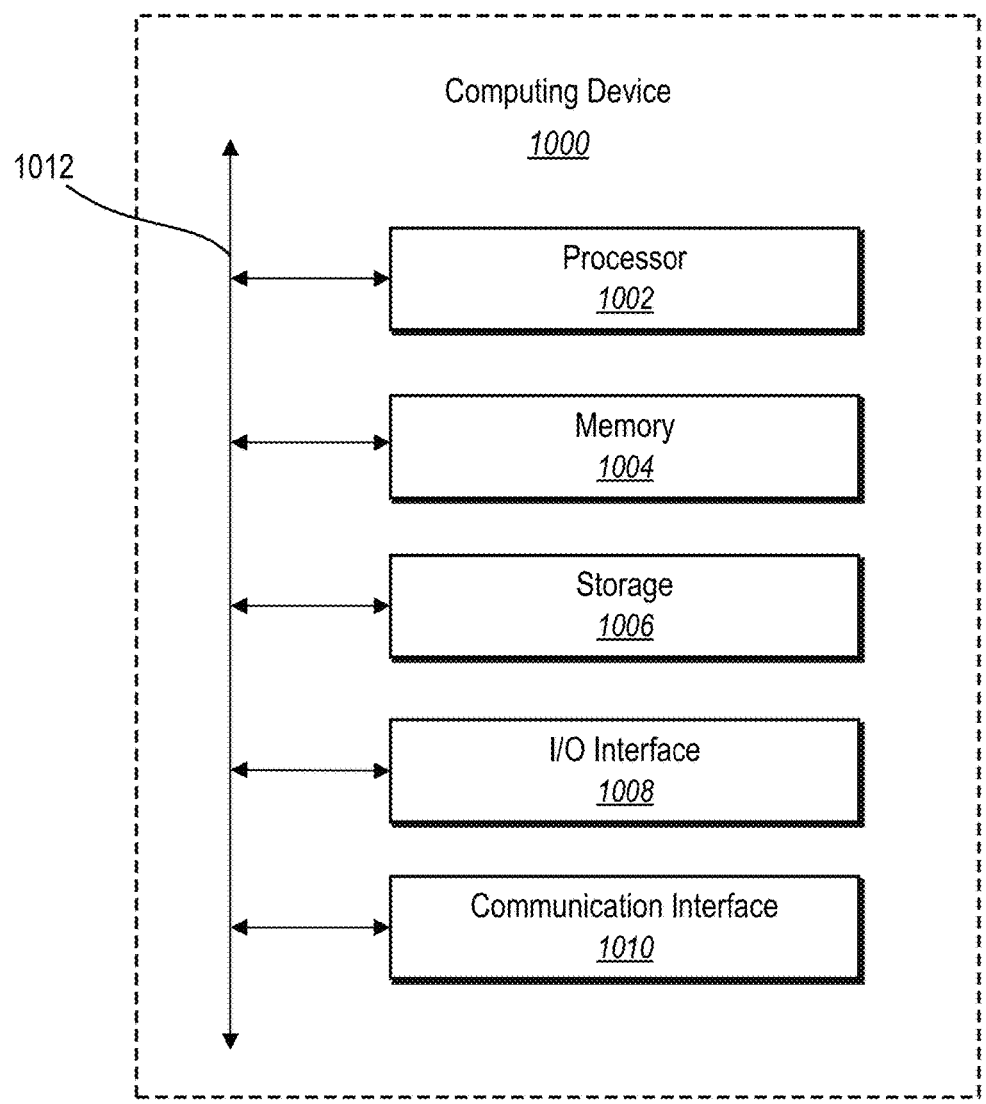
FIG. 10 illustrates a block diagram of an example computing device in accordance with one or more embodiments.

FIG. 10 illustrates a block diagram of exemplary computing device 1000 that may be configured to perform one or more of the processes described above. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions for digitizing real-world objects, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions related to object digitizing processes (e.g., digital scans, digital models).

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment that tracks locations and activities of client devices, a computer-implemented method of dynamically defining a virtual boundary comprising:
   receiving an indication of a user action to promote;
   identifying an application activity of a user application associated with the user action to promote;
   tracking activity data of a plurality of client devices having the user application thereon, the activity data comprising instances of the application activity and an associated location for each instance of the application activity;
   analyzing the activity data to determine a geographic region of interest in which a first plurality of users of the plurality of client devices located within the geographic region of interest perform the application activity with a higher frequency than a second plurality of users of the plurality of client devices located outside the geographic region; and
   generating a geo-fence comprising a boundary around the geographic region of interest.

2. The method of claim 1, further comprising selectively providing a communication to any client devices having the user application thereon and determined to be located within the boundary of the geo-fence.

3. The method of claim 1, wherein identifying the application activity of the user application associated with the user action to promote comprises identifying a correlation between a client device performing the application activity and a user of the client device performing the user action to promote.

4. The method of claim 1, wherein tracking the activity data of the plurality of client devices comprises:
   receiving a collection of activity data; and
   filtering the collection of activity data to identify a subset of application activities comprising instances of the application activity of the user application associated with the user action to promote.

5. The method of claim 1, wherein analyzing the activity data to determine the geographic region of interest comprises determining a probability of the plurality of client devices that performed the application activity while at each location across a plurality of locations.

6. The method of claim 5, wherein analyzing the activity data to determine the geographic region of interest further comprises determining a probability that a given client will perform the application activity proximate to each location across the plurality of locations.

7. The method of claim 6, wherein analyzing the activity data to determine the geographic region of interest further comprises identifying ranges of locations of the plurality of locations where the probabilities exceeds a predicted probability threshold.

8. The method of claim 7, wherein generating the geo-fence comprising the boundary around the geographic region of interest comprises defining the boundary of the geo-fence around the ranges of locations of the plurality of locations where a distribution of the probabilities exceeds the predicted probability threshold.

9. The method of claim 1, wherein:
   the activity data further comprises an associated time for each instance of the application activity; and
   analyzing the activity data to determine the geographic region of interest comprises determining the geographic region of interest for a first time period based on tracked activity data limited to instances of the application activity having an associated time within the first time period.

10. The method of claim 9, further comprising:
analyzing the activity data to determine a second geographic region of interest for a second time period based on tracked activity data limited to instances of the application activity having an associated time within the second time period; and
generating another geo-fence for the second time period comprising a modified boundary around the second geographic region of interest.

11. The method of claim 1, further comprising generating a second geo-fence comprising a second boundary around a non-adjacent geographic region of interest from the boundary around the determined geographic region of interest.

12. In a digital medium environment that tracks locations and activities of client devices, a computer-implemented method of dynamically defining geographic boundaries, the method comprising:
tracking activity data of a plurality of client devices having a user application thereon, the activity data comprising instances of an application activity and associated time and location for each instance of the application activity, the application activity comprising one or more user inputs with respect to the user application;
a step for generating a geo-fence based on the tracked activity data, the geo-fence comprising a boundary around a geographic region of interest within which a first plurality of users of the plurality of client devices have a higher probability to perform the application activity than a second plurality of users of the plurality of client devices outside the geographic region of interest; and
modifying the geo-fence between a first time period and a second time period by adjusting the boundary of the geo-fence based on a difference between the tracked activity for the first time period and the tracked activity for the second time period.

13. The method of claim 12, wherein the step for generating the geo-fence comprises analyzing the activity data to determine one or more geographic regions of interest over time within which users of the plurality of client devices have at least a threshold probability to perform the application activity.

14. The method of claim 12, further comprising:
providing a first communication during the first time period to client devices having the user application thereon and determined to be located within the boundary of the geo-fence during the first time period; and
providing a second communication during the second time period to client devices having the user application thereon and determined to be located within the boundary of the modified geo-fence during the second time period.

15. The method of claim 12, further comprising:
receiving an indication of a user action to promote; and
identifying that the application activity is associated with the user action to promote, wherein tracking the activity data of the plurality of client devices comprises selectively tracking instances of the application activity associated with the user action to promote.

16. The method of claim 12, wherein modifying the geo-fence comprises enlarging the boundary of the geo-fence from the first time period to the second time period to reflect a higher frequency of tracked instances of the application activity within a proximity of the boundary of the geo-fence for the first time period.

17. The method of claim 12, wherein modifying the geo-fence comprises shrinking the boundary of the geo-fence from the first time period to the second time period to reflect a lower frequency of tracked instances of the application activity within a proximity of the boundary of the geo-fence for the first time period.

18. The method of claim 12, further comprising generating a new geo-fence for the second time period having a non-adjacent boundary to a boundary of modified geo-fence.

19. A system for tracking locations and activities of client devices and generating geographic boundaries comprising:
a memory comprising:
an indication of a user action to promote; and
activity data comprising tracked instances of application activities by a plurality of client devices associated with the user action to promote, the activity data further comprising time and geographic data associated with each instance of the application activity, the application activity comprising one or more user inputs with respect to a user application on the plurality of client devices; and
a server device comprising instructions thereon that, when executed by at least one processor, cause the server device to:
analyze the activity data to determine a geographic region of interest, wherein analyzing the activity data to determine the geographic region of interest comprises:
determining, based on the activity data, a predicted probability across a plurality of locations that indicates a probability at each location of the plurality of locations that a given client device at each location would perform the application activity; and
identifying a range of locations of the plurality of locations having determined predicted probabilities that exceed a threshold probability; and
generate a geo-fence comprising a boundary around the determined geographic region of interest.

20. The system of claim 19, further comprising instructions that cause the server device to:
determine that a client device having the user application is located within the boundary of the geo-fence; and
in response to determining that the client device having the user application is located within the boundary of the geo-fence, provide a communication to the client device via the user application.

* * * * *